United States Patent [19]
Brickner et al.

[11] Patent Number: 5,152,152
[45] Date of Patent: Oct. 6, 1992

[54] METHOD OF DETERMINING REFRIGERANT CHARGE

[75] Inventors: Laurence R. Brickner, Marathon, N.Y.; David A. Christiansen, Bloomington, Minn.

[73] Assignee: Thermo King Corporation, Minneapolis, Minn.

[21] Appl. No.: 833,227

[22] Filed: Feb. 10, 1992

[51] Int. Cl.[5] ............................................. F25B 49/00
[52] U.S. Cl. ........................................ 62/126; 62/129
[58] Field of Search ................ 62/125, 126, 129, 130, 62/149, 77, 292; 364/557, 578

[56] References Cited

U.S. PATENT DOCUMENTS

| | | | |
|---|---|---|---|
| 4,402,191 | 9/1983 | King | 62/239 |
| 4,409,797 | 10/1983 | King et al. | 62/239 |
| 4,463,576 | 8/1984 | Burnett et al. | 62/126 X |
| 4,663,725 | 5/1987 | Truckenbrod et al. | 364/505 |
| 4,790,143 | 12/1988 | Hanson | 62/129 X |
| 4,918,932 | 4/1990 | Gustafson et al. | 62/89 |
| 5,009,074 | 4/1991 | Goubeaux et al. | 62/126 X |
| 5,009,076 | 4/1991 | Winslow | 62/129 |
| 5,044,168 | 9/1991 | Wycoff | 62/129 X |

Primary Examiner—Harry B. Tanner
Attorney, Agent, or Firm—D. R. Lackey

[57] ABSTRACT

A method of determining if the refrigerant charge in a refrigeration system is within an acceptable range, including the step of developing a model evaporator temperature-versus-time signature for a system known to have a recommended refrigerant charge level. The model developing step includes the steps of isolating an evaporator from a space to be conditioned by the system, operating the system in a cooling mode to cool the evaporator, trapping refrigerant in the cooled evaporator to introduce an instability into the cooling cycle, and continuing the cooling mode for a time sufficient for a system having an acceptable charge level to recover from the trapping step. A test signature is then provided for a system to be checked, using steps similar to those used to develop the model signature, and the test signature is compared with the model signature to determine if the refrigerant charge is within an acceptable range.

18 Claims, 7 Drawing Sheets

METHOD OF DETERMINING REFRIGERANT CHARGE

TECHNICAL FIELD

The invention relates in general to refrigeration systems, and more specifically to a method of determining the sufficiency of the refrigerant charge in a refrigeration system.

BACKGROUND ART

It is important that any refrigeration system have a sufficient or adequate charge of refrigerant to accomplish the function for which the refrigeration system was designed. A typical refrigeration system is required to cool a conditioned space to a predetermined temperature selected from a relatively narrow temperature range, and the typical refrigeration system is operated within an ambient temperature which also varies within a predetermined relatively narrow range. Thus, regardless of the method used to test adequacy of refrigerant charge, it is relatively easy to duplicate the operating ambient and to set the objectives to be accomplished in the space to be conditioned.

A transport refrigeration system, such as the refrigeration systems used on trucks, trailers, and reefers, is not a typical refrigeration system. It is not a typical refrigeration system because it is required to hold the temperature of a served space to any selected set point temperature in a wide range, such as to a selected set point temperature within a range of $-20°$ F. to $+80°$ F. ($-29°$ C. to $+26.7°$ C.), with ambient temperatures which range from winter to summer in different parts of the world. Determining sufficiency of refrigerant charge in a transport refrigeration system is thus difficult because it is not easy to reproduce the most severe operating and ambient temperature conditions which a transport refrigeration system must be able to accommodate.

The traditional method of verifying adequate refrigerant charge in a transport refrigeration system, such as a refrigerated truck, trailer, or container (reefer) involves the steps of cooling the associated cargo and cargo space to a low set point temperature, such as 0 degrees F. ($-17.8°$ C.), while under actual or simulated high ambient temperature conditions, eg., 150 pounds compressor head pressure. This method confirms that the system has sufficient refrigerant charge to operate under this extreme condition.

The traditional method, however, is very time consuming, due to the broad range of possible set point temperatures and the large thermal mass of a refrigerated transport refrigeration system, and the traditional method is only practical when the load in the associated conditioned space will not be damaged by the deep cooling of the conditioned cargo space. Further, the traditional method will not detect an over-charge condition, which may damage the refrigerant compressor due to excessive head pressures.

It would be desirable, and it is an object of the present invention, to provide new and improved methods for more rapidly determining whether the refrigerant charge in a transport refrigeration system is within an acceptable range, before removal of the transport refrigeration system from a terminal where inadequate charge, or an over-charge condition, may be remedied.

It is also an object of the invention to provide such more rapid refrigerant charge determining methods which are applicable to transport refrigeration systems which are already loaded with cargo to be conditioned, without danger of damaging the cargo, regardless of the required set point temperature.

SUMMARY OF THE INVENTION

Briefly, the invention is a method of determining if the refrigerant charge in a refrigeration system is within an acceptable range by simulating the extreme conditions which may be imposed and encountered, by artificially manipulating the conditions the refrigerant charge encounters, and comparing the measured reaction to a known signature. An acceptable range of refrigerant for a transport refrigeration system is that range which will enable the transport refrigeration system to perform as required while either cooling or heating an associated conditioned space to a predetermined set point temperature set to the extreme limits of required operating performance, while surrounded by an ambient temperature which represents the most extreme condition for the specific set point temperature selected.

The method includes the step of developing a model evaporator temperature-versus-time signature curve for a refrigeration system known to have a refrigerant charge within an acceptable range. The step of developing the model signature includes the steps of isolating the evaporator from the conditioned space, operating the refrigeration system in a cooling mode to cool the evaporator, trapping refrigerant in the cooled evaporator to introduce an instability into the cooling cycle, detecting recovery of the refrigeration system from the instability, and continuing the cooling mode for a predetermined time, with the predetermined time being sufficient for a refrigeration system having a refrigerant charge within an acceptable range to recover from the trapping step.

The method continues with the step of providing a test evaporator temperature-versus-time signature curve for a refrigeration system to be checked for refrigerant charge level, with this step including the same isolating, operating, trapping, detecting and continuing steps used to obtain the model signature. The test signature is then compared with the model signature in a comparison step tailored to determine if the refrigerant charge is within the acceptable range.

In a preferred embodiment of the invention, the step of isolating the evaporator from the conditioned cargo space includes the step of preventing the evaporator air delivery means which normally discharges conditioned air into the cargo space, from discharging conditioned air into the cargo space during the testing procedure. In transport refrigeration systems in which the evaporator air delivery means, eg., fans or blowers, is operated independently from the operation of a compressor prime mover, the evaporator air delivery means may simply be turned off. In systems where the evaporator air delivery means is operated by the compressor prime mover, a defrost shutter between the evaporator and cargo, which is normally only closed during defrosting of the evaporator, may be closed.

In the preferred embodiment of the invention, the step of operating the refrigeration system in a cooling mode operates the refrigeration system at the maximum cooling rate, with the step of trapping refrigerant in the cooled evaporator including of the step of introducing a predetermined restriction in the suction line, preferably by partially closing a suction line modulation valve to a predetermined point.

The step of comparing the test signature with the model signature, in the preferred embodiment of the invention, includes the step of performing predetermined successive comparison checks during the step of providing the test signature, with the comparison checks including checks which quickly detect severe under and over refrigerant charge conditions. Upon the detection of a severe under or over refrigerant charge condition, the invention, in a preferred embodiment, includes the step of immediately terminating the test procedure.

For example, one such comparison check may include the steps of determining if the temperature of the evaporator has been reduced below a predetermined temperature before a predetermined period of time has elapsed, and selecting the predetermined evaporator temperature and the predetermined period of time such that failure of the refrigeration system to reduce the temperature of the evaporator below the predetermined temperature before the predetermined period of time elapses indicates an insufficient refrigerant charge condition.

Another of the successive comparison checks may include, for example, in addition to the step of detecting recovery of the refrigeration system from the trapping step, the steps of determining if the temperature of the evaporator exceeds a predetermined temperature before the detecting step detects recovery of the refrigeration system, and before a predetermined period of time elapses, and selecting the predetermined temperature and predetermined period of time such that if the temperature of the evaporator exceeds the predetermined temperature before the predetermined period of time elapses, and before the detecting step detects recovery of the refrigeration system, it indicates an insufficient refrigerant charge condition; and, the if the predetermined period of time elapses before the temperature of the evaporator exceeds the predetermined temperature, and before the detecting step detects recovery of the refrigeration system, it indicates an excessive refrigerant charge condition.

The invention, in another embodiment, includes the step of determining the average slope of the test signature, with the step of detecting recovery of the refrigeration system including the step of detecting a sign change in the average slope of the test signature from positive to negative.

In another embodiment, the method includes the step of terminating the step of providing the test signature after a predetermined period of time, if not earlier terminated by one of the successive comparison checks, with the refrigeration charge in the system being determined as a function of the temperature of the evaporator at the end of the predetermined period of time, and the average slope of a predetermined portion of the test signature.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

In general, the invention involves developing a model evaporator-versus-time signature curve for a specific refrigeration system known to have a recommended refrigerant charge, and then developing a test signature for a similar refrigeration system whose charge of refrigerant is unknown, to determine if the charge is too low, or too high. In the case of a transport refrigeration system, such test procedure is performed before the transport refrigeration system is allowed to leave a terminal where an improper charge level may be remedied.

For purposes of example, the specific refrigeration system chosen to develop a model evaporator temperature-versus-time signature for is the transport refrigeration system shown in U.S. Pat. Nos. 4,402,191 and 4,409,797, which patents are assigned to the same assignee as the present application. A suitable refrigerant piping diagram for the transport refrigeration system shown in the aforesaid patents is shown in U.S. Pat. No. 4,918,932, with FIG. 1 of the present application being a modification of the refrigerant piping diagram shown in U.S. Pat. No. 4,918,932.

Figure 1:
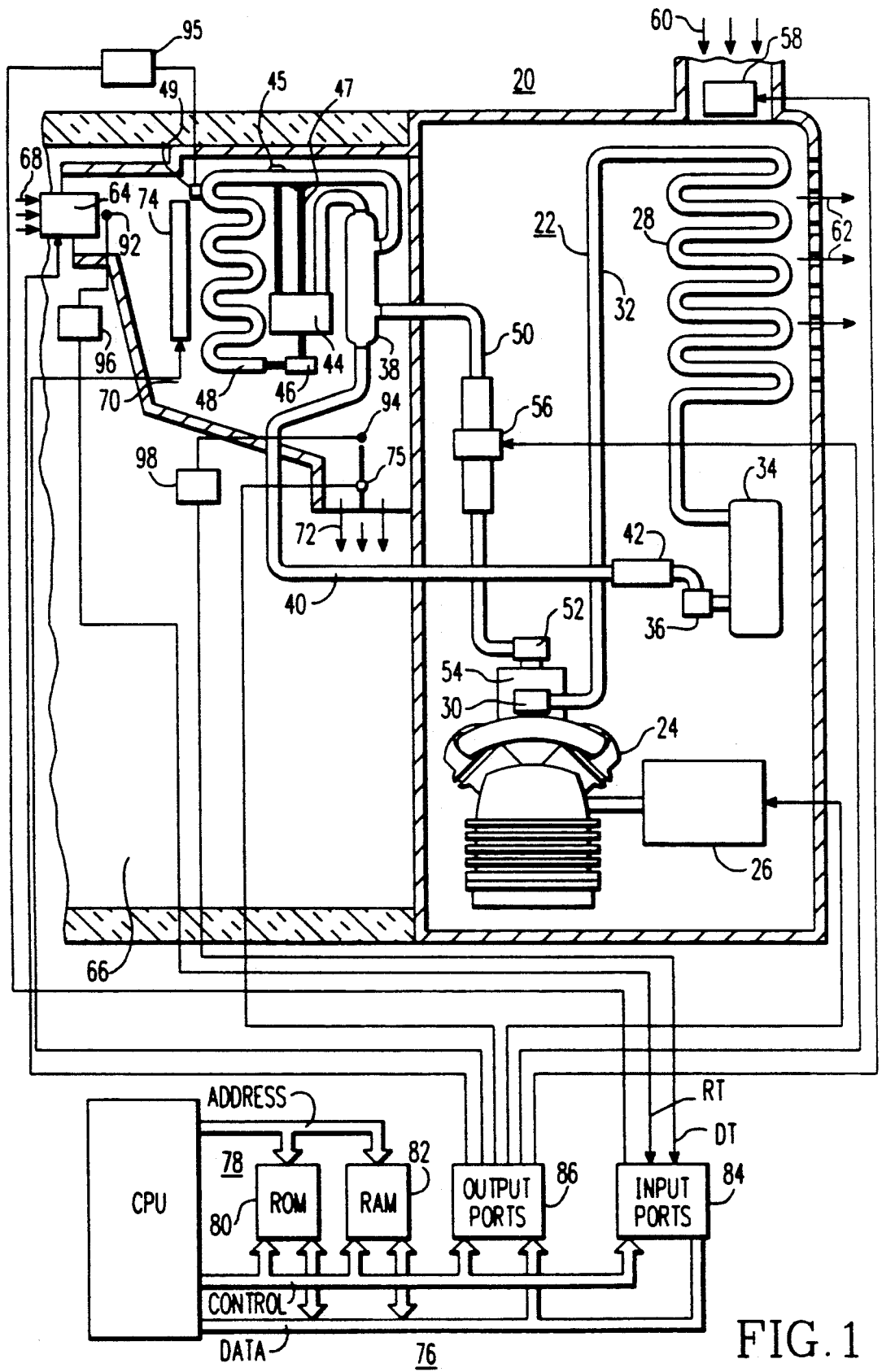
FIG. 1 is a schematic piping and wiring diagram of a transport refrigeration system which may be operated according to the refrigerant charge measuring methods of the invention.

Referring now to the drawings, and to FIG. 1 in particular, there is shown a piping and electrical schematic diagram of a transport refrigeration system 20 which may be controlled according to the methods of the invention to develop a model evaporator temperature-versus-time signature. The model signature is then used to develop check points for use in a test procedure while developing a test signature for a similar transport refrigeration system to determine refrigerant charge level. While the aforesaid patents are associated with a refrigerated container or reefer, it is to be understood that the teachings of the invention apply equally to other transport refrigeration systems, such as those associated with a truck or a trailer, and to any other refrigeration system to be checked for adequacy of refrigerant charge.

More specifically, transport refrigeration system 20 includes a refrigerant circuit 22 which includes a refrigerant compressor 24 driven by a prime mover, such as an electric motor, in the case of a reefer, or an internal combustion engine, with the prime mover being shown generally at 26. Discharge ports of compressor 24 are connected to an inlet of a condenser 28 via a discharge service valve 30 and a hot gas line 32. The outlet side of condenser 28 is connected to an inlet side of a refrigerant receiver 34. An outlet valve 36 on the outlet side of receiver 34 is connected to a first path through a heat exchanger 38 via a liquid line 40 which may include a refrigerant drier 42.

Liquid refrigerant from liquid line 40 continues to a thermostatic expansion valve 44, which is controlled by an expansion valve thermal bulb 45 and an equalizer line 47. The outlet of expansion valve 44 is connected to a refrigerant distributor 46 which distributes refrigerant to inlets on the inlet side of an evaporator 48. The temperature of evaporator 48 is sensed by a thermal sensor 49. The outlet side of evaporator 48 is connected to a suction port of compressor 24 via another path through heat exchanger 38, a suction line 50, a suction line service valve 52, and a suction throttling valve 54. Also disposed in suction line 50 is an electrically controllable modulation valve 56. If a refrigerant accumulator (not shown) is disposed in the suction line 50 between heat exchanger 38 and compressor 24, then the controllable modulation valve 56 is preferably located between the outlet side of evaporator 48 and the heat exchanger 38, such as shown in U.S. Pat. No. 4,977,751. This preferred location utilizes the volumes of heat exchanger 38 and the accumulator to accommodate any refrigerant surges which may occur while modulation valve 56 is being controlled.

A condenser blower or fan 58 draws ambient air, indicated by arrows 60, over condenser 28, and the heated air is discharged from system 20, as indicated by arrows 62. Evaporator air delivery means 64, such as a fan or a blower, draws return air from a cargo space 66, with the return air, indicated by arrows 68, being drawn into an evaporator plenum 70 where it passes over the evaporator 48. The resulting conditioned air, indicated by arrows 72, is discharged back into the served cargo space 66.

Means is provided for adding heat to the conditioned air when necessary to hold a selected set point temperature, or for defrosting the evaporator 48, such as electrical heaters 74; or, by passing hot refrigerant gas directly through the evaporator 48, as desired. If the evaporator air delivery means 64 is individually controllable, eg., not directly belted to prime mover 26, then air delivery means 64 may simply be turned off when the evaporator 48 is being defrosted. If air delivery means 64 must operate while prime mover 26 is operating, a solenoid operated defrost damper 75 may be provided to prevent air 72 from being discharged into cargo space 66 during defrost.

Electrical control 76 for controlling the operation of transport refrigeration system 20 is illustrated as including a microprocessor or computer 78 which includes a read-only memory (ROM) 80, a random-access memory (RAM) 82, input ports 84 for receiving information from system 20, and output ports 86 for providing control signals for various controllable devices in system 20. Of course, control function 76 may be implemented in other ways, such as with a programmable controller, and hard wired logic; or, with thermostatic temperature control modules.

Electrical control 76, among other things, receives input signals from evaporator temperature sensor 49, and return air and discharge air temperature sensors 92 and 94 disposed in evaporator plenum 70. The temperature signals, for example, may return to input ports 84 of computer 78 via signal conditioners 95, 96 and 98, respectively, which may include A/D converters.

Electrical control 76 provides output signals for controlling condenser fan or blower 58; suction line modulation valve 56; prime mover 26, and thus compressor 24; evaporator air delivery means 64; electrical heaters 74; and, defrost damper 75, if used.

Figure 2:
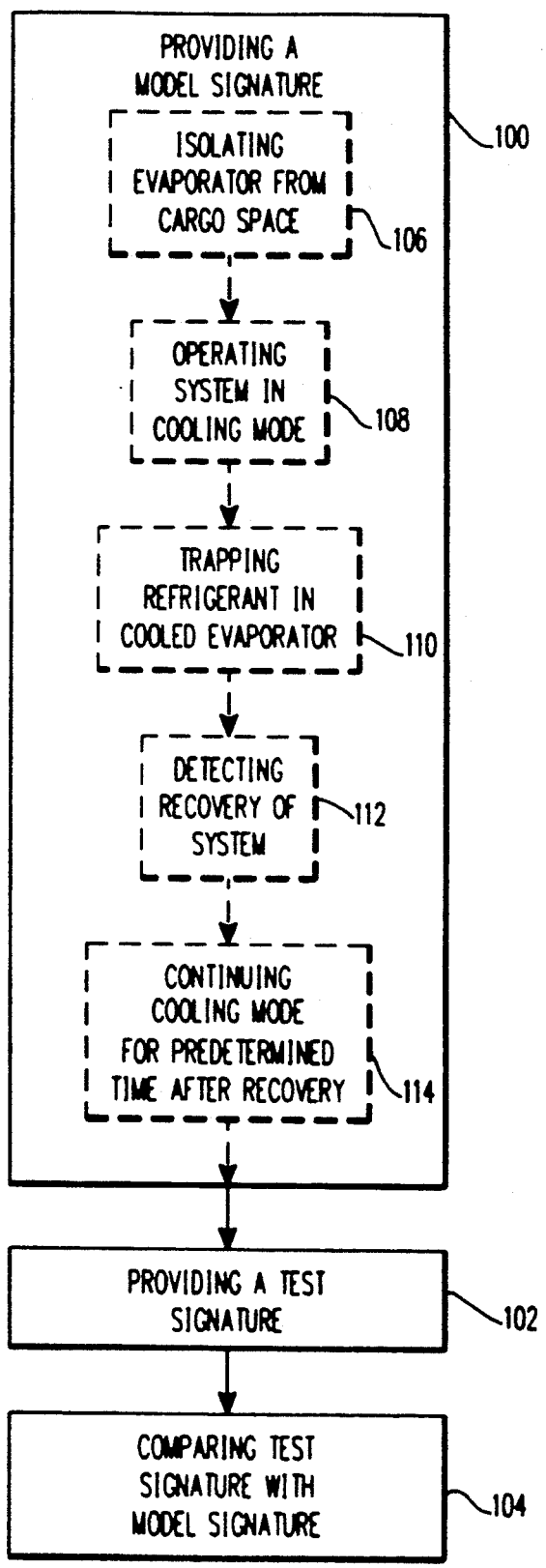
FIG. 2 is a block diagram which sets forth preferred method steps of the invention.

The teachings of the invention are broadly set forth in FIG. 2, with FIG. 2 being a block diagram which sets forth preferred method steps of the invention. Block 100 indicates a step of the inventive method which provides a model evaporator coil temperature-versus-time signature for a transport refrigeration, such as transport refrigeration system 20, which is known to have a standard refrigerant charge recommended by the manufacturer of system 20. Only one model signature need be prepared for a specific transport refrigeration system, as the model signature may thereafter be used to test any number of like transport refrigeration systems. After a model signature has been prepared, as indicated in block 102, a test evaporator temperature-versus-time signature is prepared for a similar transport refrigeration system, whose refrigerant charge level is unknown. The test signature is then compared with the model signature, as indicated in block 104, to detect a charge level which is under, or over, the range recommended by the manufacturer of the transport refrigeration system being tested. As will be hereinafter described, a preferred implementation of the comparison step 104 is to develop a plurality of sequential test or check points during the development of the test signature. In other words, instead of waiting until a complete signature test procedure is run, go, no-go, test points are applied during the development of the test signature which may significantly shorten the time required to determine if the refrigerant charge is within a recommended range.

Each of the model and test signatures are prepared according to the teachings of the invention, as set forth in greater detail within block 100. The first step, indicated by block 106, is to isolate evaporator 48 from the box or cargo space 66, so that the test procedures may be performed without regard to the type of load which may be in cargo space 66, and without regard to the desired set point temperature for the load which may be in cargo space 66. Step 106 may be performed, for example, by turning off the evaporator air delivery means 64, if independently controllable; or by closing the defrost damper 75, on systems equipped with a defrost damper.

The next step, indicated by block 108 is to operate system 20 in a cooling mode, and preferably at the maximum cooling rate associated with system 20, as the invention requires that the evaporator coil 48 be cold to facilitate the next step of the method. The operation of system 20 from the start of the test procedure is timed, so that the occurrence of predetermined events may be related to elapsed time from the start of the test signature testing procedure.

The next step, indicated by block 110, is to introduce an instability into the operation of the system 20, so recovery of system 20 from the instability may be observed. The preferred implementation of the step of introducing an instability into system 20, as set forth within block 110, is by quickly trapping as large a quantity as possible of refrigerant in the evaporator 48, after the temperature of evaporator 48 has been reduced to a predetermined temperature, which predetermined temperature may be related to the temperature of cargo space 66. It has been found that more refrigerant is trapped when the evaporator is cold. In a preferred embodiment of the invention, the trapping step is performed by closing suction line modulation valve 56 to a predetermined point. Different valve closed points were experimented with, and with the specific system tested, a 60% closed point was selected. The modulation valve 56 is not completely closed, as after the trapping step, system 20 must be able to recover by bleeding trapped refrigerant back into the system, so that the cooling mode may be continued. If the transport refrigeration system being tested has the modulation valve 56 in parallel with a suction line solenoid valve, such as shown in U.S. Pat. No. 4,663,725, the paralleled suction line solenoid valve must be closed at the time the modulation valve is partially closed to the predetermined point The next step, indicated by block 112, is to detect recovery of system 20 after the trapping step has introduced the instability in the cooling mode. In a properly charged system 20, the temperature of evaporator 48 will rise for a predetermined period of time after the introduction of the instability, changing the evaporator temperature versus time slope from negative to positive, and then the evaporator temperature will start dropping as system 20 recovers, again changing the slope of the evaporator temperature versus time slope, this time from positive to negative. If the charge is below the recommended range, system 20 may take a relatively long time to recover, and if the charge is excessive, system 20 may recover very fast, and indeed it may not even have a signature which includes a portion having a positive temperature slope. Thus, a convenient way of implementing the detection of recovery step 112 is to detect a slope change in the test signature from positive to negative.

Step 114 then continues the cooling mode for a predetermined period of time, with the suction line restriction introduced in step 110 retained, to observe the slope of the signature after recovery, and the final temperature of evaporator 48 at the end of the predetermined period of time, which signifies the end of the test procedure.

Figure 3:
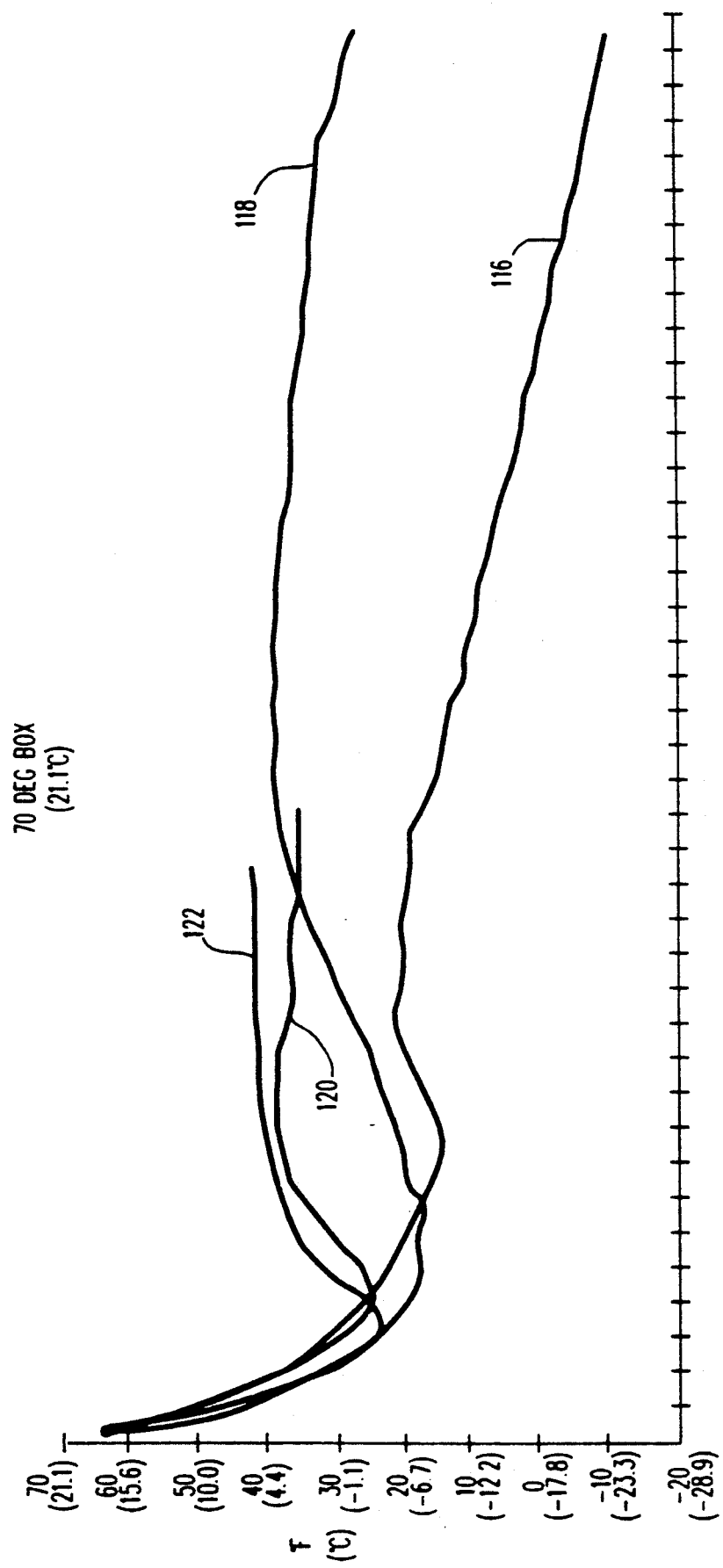
FIG. 3 is a graph which plots evaporator temperature versus time of different tests of the transport refrigeration system shown in FIG. 1 while operating in a cooling cycle with different amounts of refrigerant charge, with the temperature of the conditioned space being at 70° F. (21.1° C.)
Figure 4:
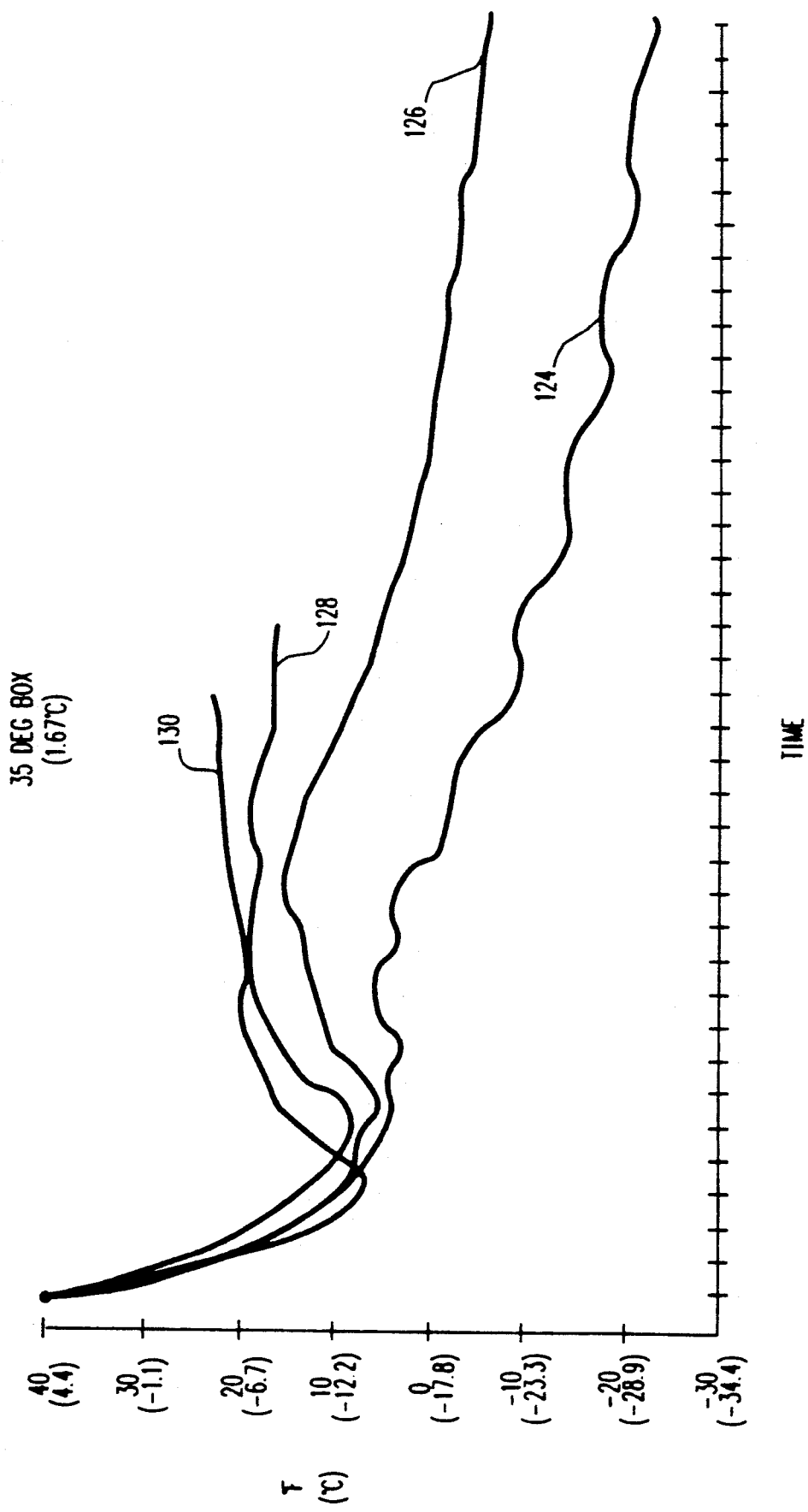
FIG. 4 is a graph which plots evaporator temperature versus time of different tests of the transport refrigeration system shown in FIG. 1 while operating in a cooling cycle with different amounts of refrigerant charge, with the temperature of the conditioned space being at 35° F. (1.67° C.)
Figure 5:
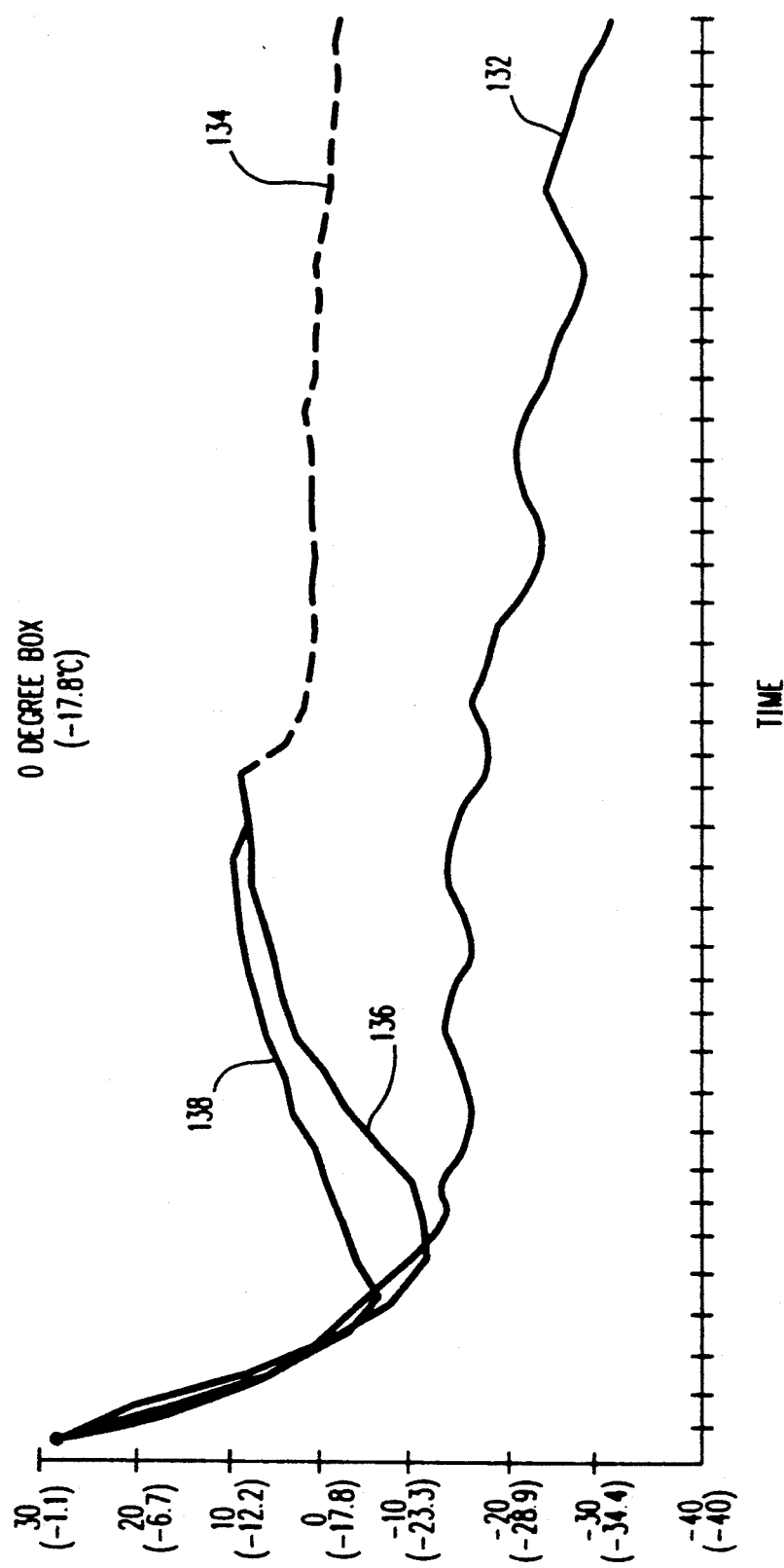
FIG. 5 is a graph which plots evaporator temperature versus time of different tests of the transport refrigeration system shown in FIG. 1 while operating in a cooling cycle with different amounts of refrigerant charge, with the temperature of the conditioned space being at 0° F. (−17.8° C.)
Figure 6:
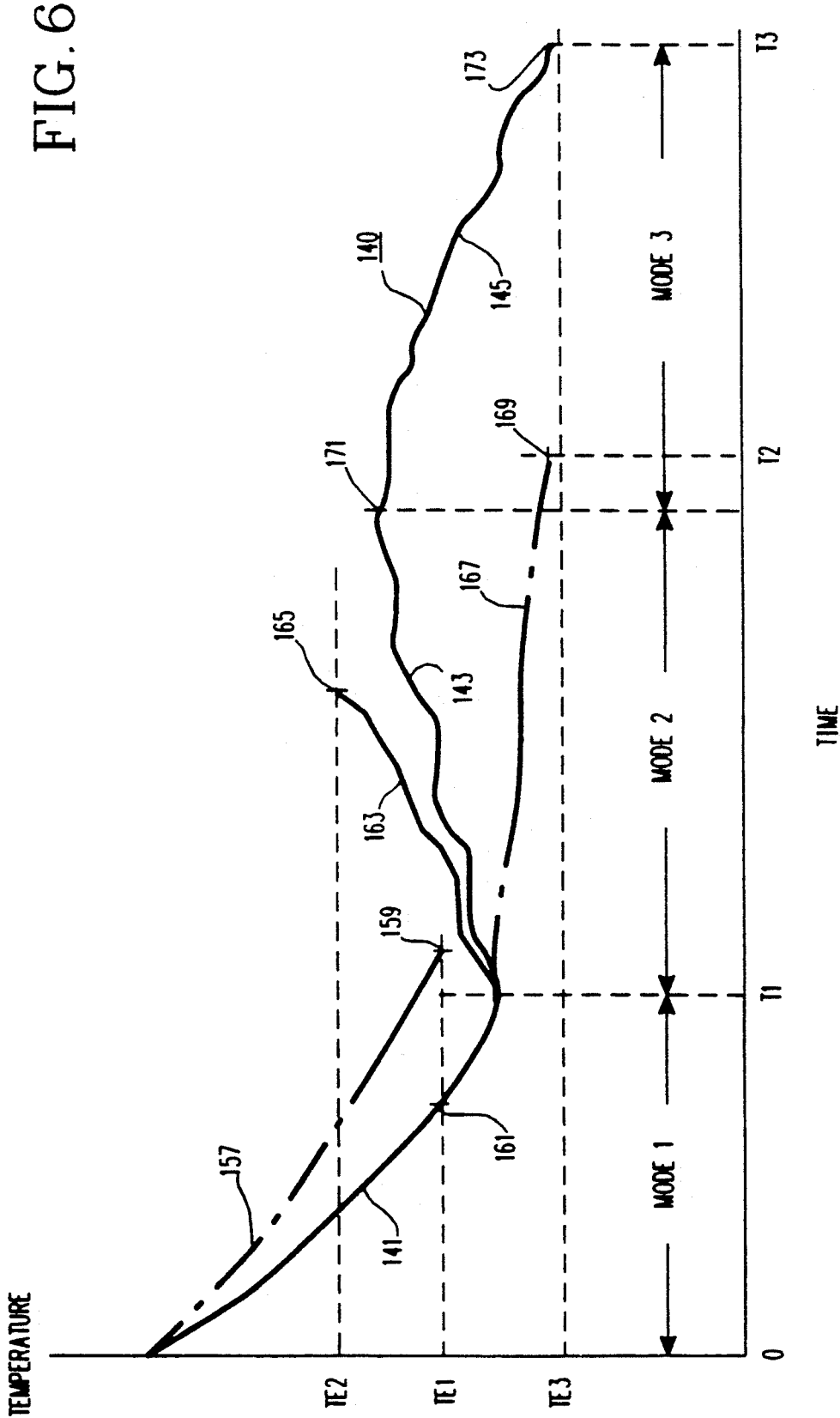
FIG. 6 is a generic graph prepared from the test results shown in FIGS. 3, 4 and 5, which divides a resulting model evaporator temperature-versus-time signature curve into three distinct modes which are utilized in the teachings of the invention.

In order to develop a model evaporator temperature-versus-time signature, shown in FIG. 6, transport refrigeration system 20 was operated with different box or cargo 66 temperatures, with 70° F.(21.1° C.), 35° F.(1.67° C.), and 0° F. (−17.8° C.), being selected for purposes of example, and with the results of various tests at these cargo 66 temperatures being respectively set forth in FIGS. 3, 4 and 5. The various curves shown in FIGS. 3, 4 and 5 plot the temperature of evaporator 48, as sensed by sensor 49, on the ordinate, versus time on the abscissa. It is to be understood that the temperature of evaporator 48 may be determined by other means, such as by using the temperature of the discharge air as sensed by discharge air sensor 94. The divisions shown on the abscissa indicate sampling readings taken 70 seconds apart.

The curves in FIGS. 3, 4 and 5 indicate the temperature of evaporator 48 with different charges of refrigerant in system 20, with system 20 being operated at the maximum cooling rate with evaporator 48 isolated from cargo space 66, which was accomplished in the exemplary example by turning off the evaporator air delivery means 64. An acceptable range for coolant in system 20 is 14–17 pounds.

Referring to FIG. 3, which is associated with a cargo space having a temperature of 70° F. (21.1° C.), curve 116 indicates the operation of system 20 at full cool with 15 pounds of refrigerant charge. Curve 118 indicates the temperature of evaporator 48 with only 8 pounds of refrigerant, operated at the maximum cooling rate. Curves 120 and 122 indicate the temperature of evaporator 48 with charges of 11 and 8 pounds, respectively, with 60% suction line modulation being introduced when the temperature of evaporator 48 dropped to 25° F. (−3.89° C.).

Referring to FIG. 4, which is associated with a cargo space having a temperature of 35° F. (1.67° C.), curve 124 indicates the operation of system 20 at full cool with 15 pounds of refrigerant charge. Curve 126 indicates the temperature of evaporator 48 with only 8 pounds of refrigerant, operated at the maximum cooling rate. Curves 128 and 130 indicate the temperature of evaporator 48 with charges of 11 and 8 pounds, respectively, with 60% suction line modulation being introduced when the temperature of evaporator 48 dropped to 10° F. (−12.2° C.).

Referring to FIG. 5, which is associated with a cargo space having a temperature of 0° F. (−17.8° C.), curve 132 indicates the operation of system 20 at full cool with 15 pounds of refrigerant charge. Curve 134 indicates the temperature of evaporator 48 with only 8 pounds of refrigerant, operated at the maximum cooling rate. Curves 136 and 138 indicate the temperature of evaporator 48 with charges of 11 and 8 pounds, respectively, with 60% suction line modulation being introduced when the temperature of evaporator 48 dropped to 0° F. (−23.3° C.).

In general, the curves shown in FIGS. 3, 4 and 5 illustrate that system 20 has an evaporator temperature-versus-time profile which is characterized by three modes, which is set forth in a solid line generic model signature 140 for system 20 in FIG. 6. First, model signature 140 has a "mode 1", shown in solid curve portion 141 in FIG. 6, with mode 1 having an initial rapid temperature pull down. Second, model signature 140 has a "mode 2", shown in solid curve portion 143 in FIG. 6, with mode 2 being a period of instability as refrigerant surges in the system. Third, model signature 140 has a "mode 3", shown in solid curve portion 145 in FIG. 6, with mode 3 being a relatively long period of time as the system asymptotically approaches steady state conditions.

Each period can be described in terms of three parameters; duration of the mode, slope between key thresholds in each mode, and short-term changes in the sign of the slope, indicating short-term instability. The third parameter may best be expressed as a frequency in cycles per unit time.

The three parameters of the three modes provide a total of nine parameters which may be selectively used in developing a test procedure, as the nine parameters are uniquely related to the physical configuration of the specific transport refrigeration system being tested, and to the amount of refrigerant charge in the system. For example, a long duration in mode 1 may indicate a high over-charge, such as caused by excess refrigerant which fills the condenser with liquid and blocks hot gas from condensing; or, a severe under-charge condition.

The signature concept of the invention is applied, in a preferred embodiment of the invention, in a sequential test arrangement, with each mode indicating over-charge, under-charge, or no decision. No decision implies the requirement to continue the test into the next mode.

Figure 7:
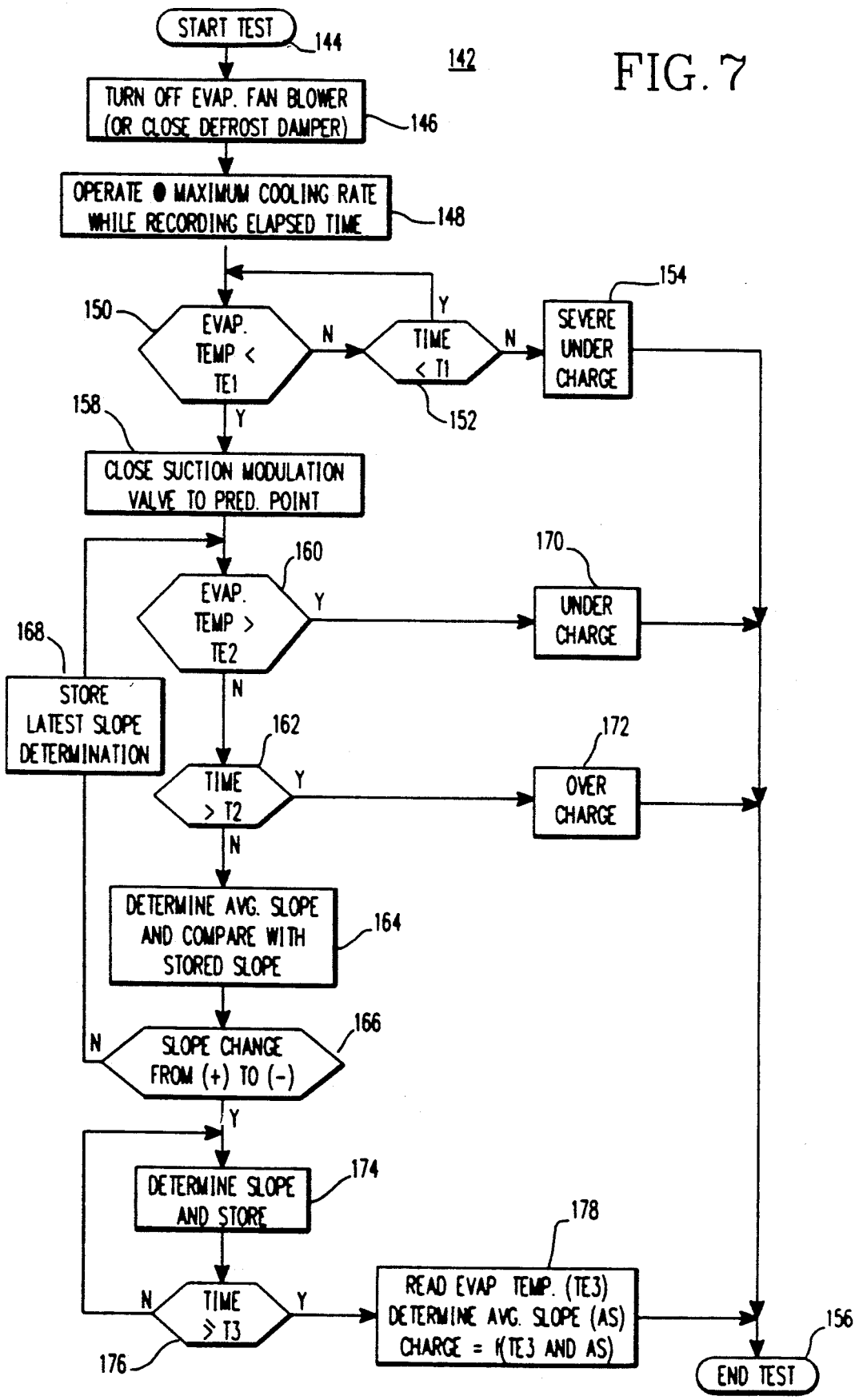
FIG. 7 is a detailed flow chart of a specific implementation of the method set forth in the block diagram of FIG. 2, which sets forth steps for determining whether the refrigerant charge in a transport refrigeration system is within an acceptable range.

FIG. 7 is a flow chart of a program 142 setting forth a detailed specific implementation of a sequential testing arrangement which was prepared for system 20, using parameters of the model signature 140 shown in FIG. 6. Program 142 is entered at 144 and step 146 isolates evaporator 48 from the cargo in cargo space 66 by turning off the evaporator air delivery means 64, eg., electric motors driving associated evaporator fans or blowers, are de-energized. As hereinbefore stated, step 146 may also be implemented by closing defrost damper 75, on systems having such a damper.

Step 146 proceeds to step 148 which places system 20 in a cooling mode and operates system 20 at the maximum cooling rate, which is commonly used only for initial temperature pull down of cargo space 66. As hereinbefore stated, the objective of trapping as large a quantity of refrigerant in evaporator coil 48 is facilitated by having the evaporator very cold.

A first of several sequential tests is implemented by steps 150 and 152 during temperature pull down of evaporator 48, ie., during mode 1 of the test signature, with step 150 determining when the temperature of evaporator 48 is pulled below a predetermined temperature TE1. Each time the temperature of evaporator 48 is sampled it is compared with temperature TE1, and when it is not less than TE1, step 152 determines if the elapsed time since the start of the test procedure has reached a first predetermined period of time T1. Step 152 returns to step 150 each time the "no" branch of step 150 enters step 152 and step 152 finds time T1 has not elapsed. Steps 150 and 152 remain in a loop until either time T1 elapses, or the temperature of evaporator 48 drops below temperature TE1. If temperature TE1 is not reached before the elapsing of the first predetermined period of time T1, for example as illustrated by a broken line curve portion 157 reaching temperature TE1 at point 159, after the elapsing of time T1, step 152 proceeds to step 154, which signals a severe under-charge condition. The test procedure is immediately terminated, as indicated by step 156. The severe under-charge condition may be signaled, for example, by a display, a print-out, and the like.

If the temperature of evaporator reaches TE1 before the elapsing of time T1, such as indicated at point 161, no decision is made on the question of charge level, and the program proceeds to step 158 which introduces a predetermined instability into system 20. As illustrated, step 158 introduces the instability by partially closing suction line modulation valve 56 to a predetermined point, which may be determined experimentally for the specific transport refrigeration system being tested, with system 20 using 60% modulation, ie., valve 56 is 60% closed. Initiation of step 158 is preferably responsive to the temperature of evaporator 48 being pulled down to a predetermined temperature, which, as was hereinbefore stated, is preferably related to the temperature of the cargo in cargo space 66. It would also be suitable to use elapsed time after the "yes" branch proceeds to step 158, to initiate step 158, but the temperature of evaporator 48 is preferred.

Step 158 proceeds to step 160 with steps 160, 162, 164, 166 and 168 implementing two more sequential check points which detect an over-charge condition, and an under charge condition, with these checks being performed in mode 2 of the test signature. In mode 2, the temperature of evaporator 48 should rise for a short period, before system 20 recovers and again starts pulling the temperature of evaporator 48 down. Step 160 compares the latest reading of the temperature of evaporator 48 with a second predetermined temperature TE2, which is higher than temperature TE1. Upon finding that the temperature of evaporator 48 has not risen to TE2, step 162 determines if the elapsed time has reached a second predetermined value T2. Time T2 is selected to be sufficient for an adequately charged system 20 to recover from the instability and again start cooling evaporator 48. When step 162 finds that the elapsed time has not reached T2, step 162 advances to steps 164 and 166 which detect recovery of system 20 from the instability imposed by the suction line restriction in step 158. Step 164 determines the average slope of the temperature curve over a last predetermined portion of mode 2, and compares it with a prior stored reading of an immediately preceding portion of mode 2. Step 166 checks the comparison to see if the sign of the slope has changed from (+) to (−), indicating recovery of a properly operating system 20 and the end of mode 2. When step 166 does not find such recovery, step 166 proceeds to step 168 which stores the latest slope determination for use in step 164, replacing the presently stored value, and step 168 returns to step 160.

The program loops through steps 160, 162, 164, 166 and 168 until the first of three possible events takes place. The first possible event is for the temperature of evaporator 48 to rise above TE2, indicated by broken line curve portion 163 rising to intersect temperature TE2 at point 165, before time T2 elapses and before recovery is detected, which indicates an under-charge condition. When this event occurs, a "yes" branch from step 160 proceeds to step 170 which signals the under-charge condition, and the test procedure terminates at 156.

The second possible event is for the time T2 to elapse, as indicated by broken line curve portion 167 reaching time T2 at point 169 before the temperature of evaporator 48 rises above TE2, and before recovery of system 20 is detected, indicating that system 20 has an over-charge condition. In other words, no recovery is detected because the system never went into a proper period of instability, the evaporator temperature, indicated by broken line curve portion 167, never experienced a positive slope and thus step 166 cannot detect a change in slope from (+) to (−). In this event, the "yes" branch from step 162 goes to step 172, which signals the over-charge condition, and the test procedure terminates at 156.

The third possibility is for the evaporator temperature to remain below TE2 and for recovery to be detected before time T2, with recovery, indicated at point 171, occurring below temperature TE2 and prior to the elapsing of time T2. Upon detection of the third possibility, no decision is made as to charge level, and step 166 enters mode 3 at step 174.

Steps 174, 176 and 178 implement mode 3, determining the slope of the curve portion 145 during mode 3, ie., during the time between recovery of the system, indicated at point 171, until the test procedure is terminated at a predetermined time T3, indicated at point 173. More specifically, step 174 determines the slope of the test temperature-versus-time signature curve at each sampling of evaporator temperature during mode 3 and stores the value so an average of the stored readings may be subsequently made. Step 176 then checks to see if a third predetermined period of time T3 has elapsed, with time T3 being selected to provide a sufficiently long mode 3 for test procedures which reach this point to provide charge level information, determined from the slope of the mode 3 curve portion and the final temperature of evaporator 48 at the end of the test procedure. Once step 176 detects the elapsing of time T3, step 176 proceeds to step 178 which reads the final evaporator temperature TE3, and which also averages the slope determinations made during mode 3 to provide an average slope AS. The charge level in system 20 is a function of TE3 and AS, with the determination being made, for example, in a look-up table prepared from prior tests with different charge levels. The test procedure then ends at step 156.

While the disclosed methods are especially suitable for determining the adequacy of refrigerant charge in transport refrigeration systems, which present the most severe challenge to the determining adequacy of refrigerant charge, it is to be understood that the methods may also be used to advantage in any type of refrigeration system to be checked for adequacy of refrigerant charge.

We claim:

1. A method of determining if the refrigerant charge in a refrigeration system is within an acceptable range, with the refrigeration system including a space to be conditioned to a predetermined set point temperature by air flow between the conditioned space and an evaporator, comprising the steps of:
   developing a model evaporator temperature-versus-time signature for the refrigeration system having a refrigerant charge within an acceptable range,
   said model developing step including the steps of:
   isolating the evaporator from the conditioned space,
   operating the refrigeration system in a cooling cycle to cool the evaporator,
   trapping refrigerant in the cooled evaporator to introduce an instability into the cooling cycle,
   detecting recovery of the refrigeration system from the instability,
   and continuing the cooling cycle for a predetermined time after the detecting step detects recovery of the refrigeration system,
   providing a test evaporator temperature-versus-time signature for a refrigeration system to be checked for refrigerant charge level, including the isolating, operating, trapping and continuing steps used to obtain the model signature,
   and comparing the test signature with the model signature to determine if the refrigerant charge is within the acceptable range.

2. The method of claim 1 wherein the refrigeration system includes evaporator air delivery means, and wherein the step of isolating the evaporator from the conditioned space includes the step of stopping the evaporator air delivery means.

3. The method of claim 1 wherein the refrigeration system includes an evaporator defrost damper, and wherein the step of isolating the evaporator from the conditioned space includes the step of closing the evaporator defrost damper.

4. The method of claim 1 wherein the refrigeration system has a maximum cooling rate, with the step of operating the refrigeration system in a cooling cycle operating the refrigeration system at the maximum cooling rate.

5. The method of claim 1 wherein the refrigeration system includes a refrigerant compressor and a suction line between the evaporator and refrigerant compressor, and wherein the step of trapping refrigerant in the cooled evaporator includes of the step of introducing a predetermined restriction in the suction line.

6. The method of claim 5 wherein the refrigeration has a controllable modulation valve in the suction line, with the step of introducing a predetermined restriction in the suction line including the step of closing the modulation valve to a predetermined point.

7. The method of claim 1 wherein the step of comparing the test signature with the model signature includes the step of performing predetermined successive comparison checks during the step of providing the test signature, including comparison checks which detect severe under and over refrigerant charge conditions, and including the step of terminating the step of providing the test signature in the event a severe under or severe over charge condition is detecting by one of the successive comparison checks.

8. The method of claim 7 wherein one of the successive comparison checks includes the steps of:
   determining if the temperature of the evaporator has been reduced below a predetermined temperature before a predetermined period of time has elapsed,
   and selecting said predetermined evaporator temperature and said predetermined period of time such that failure of the refrigeration system to reduce the temperature of the evaporator below the predetermined temperature before the predetermined period of time elapses indicates insufficient refrigerant charge.

9. The method of claim 7 wherein one of the successive comparison checks includes the steps of:
   determining if the temperature of the evaporator exceeds a predetermined temperature before the detecting step detects recovery of the refrigeration system, and before a predetermined period of time elapses,
   and selecting the predetermined temperature and predetermined period of time such that:
   (1) the temperature of the evaporator exceeding said predetermined temperature before the predetermined period of time elapses and before the detecting step detects recovery of the refrigeration system, indicates an insufficient refrigerant charge condition, and
   (2) the elapsing of the predetermined period of time before the temperature of the evaporator exceeds the predetermined temperature, and before the detecting step detects recovery of the refrigeration system, indicates an excessive refrigerant charge condition.

10. The method of claim 9 including the step of determining the average slope of the test signature, and wherein the step of detecting recovery of the refrigeration system includes the step of detecting a sign change in the average slope of the test signature from positive to negative.

11. The method of claim 7 including the step of terminating the step of providing the test signature after a predetermined period of time, if not terminated by one of the successive comparison checks, with the refrigeration charge in the system being a function of:

(1) the temperature of the evaporator at the end of the predetermined period of time, and (2) the average slope of a predetermined portion of the test signature.

12. The method of claim 11 wherein the predetermined portion of the test signature whose average slope is determined is the portion following detection of recovery of the refrigeration system.

13. A method of determining the adequacy of refrigerant charge in a refrigeration system which includes a space to be conditioned, an evaporator coil, and evaporator air delivery means for discharging conditioned air into the conditioned space, comprising the steps of:

preventing the evaporator air delivery means from discharging conditioned air into the conditioned space, operating the refrigeration system in a cooling mode, timing the operation of the refrigeration system in said cooling mode, measuring the temperature of the evaporator, determining if the temperature of the evaporator has been reduced below a first predetermined temperature before a first predetermined period of time has elapsed, and selecting said first predetermined evaporator temperature and said first predetermined period of time such that failure of the system to reduce the temperature of the evaporator below the first predetermined temperature before the first predetermined period of time elapses indicates insufficient refrigerant charge.

14. The method of claim 13 including the steps of:

restricting refrigerant flow to introduce an instability into the refrigeration system when the determining step finds that the system has reduced the temperature of the evaporator below the first predetermined temperature before the elapsing of the first predetermined period of time, detecting recovery of the refrigeration system from the instability, determining if the temperature of the evaporator exceeds a second predetermined temperature:

(1) before recovery of the refrigeration system, and (2) before a second predetermined period of time has elapsed, and selecting the second predetermined temperature and second predetermined period of time such that:

(1) the temperature of the evaporator exceeding said second predetermined temperature before the second predetermined period of time elapses, and before recovery of the refrigeration system, indicates an insufficient refrigerant charge condition, and (2) the elapsing of the second predetermined period of time before the temperature of the evaporator exceeds the second predetermined temperature, and before recovery of the refrigeration system, indicates an excessive refrigerant charge condition.

15. The method of claim 14 wherein the refrigeration system includes a compressor, a suction line between the evaporator and compressor, and a controllable modulation valve in the suction line, with the step of restricting refrigerant flow including the step of closing the modulation valve to a predetermined point.

16. The method of claim 14 wherein step of detecting recovery of the refrigeration system includes the step of detecting when the average slope of the test signature changes from positive to negative.

17. The method of claim 14 including the steps of:

terminating the step of providing the test signature in the event of detection of under or over charge condition, and terminating the step of providing the test signature after the elapsing of a third predetermined period of time, if not terminated earlier due to the detection of an under or an over charge condition, with the refrigerant charge in the refrigeration system being a function of the temperature of the evaporator at the end of the third predetermined period of time, and the average slope of a predetermined portion of the test signature.

18. The method of claim 17 wherein the predetermined portion of the test signature is the portion between the second and third predetermined periods of time.

* * * * *